Patented Aug. 25, 1925.

1,551,373

UNITED STATES PATENT OFFICE.

HERBERT W. DAUDT, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF MAKING BENZOIC ACID.

No Drawing.   Application filed June 2, 1923.   Serial No. 643,085.

*To all whom it may concern:*

Be it known that I, HERBERT W. DAUDT, a citizen of the United States, and a resident of Penns Grove, in the county of Salem and State of New Jersey, have invented a certain new and useful Process of Making Benzoic Acid, of which the following is a specification.

This invention relates to a process of making benzoic acid and comprises heating a phthalic acid compound such as phthalic acid or a metal phthalate or preferably a mixture of phthalic acid and a metal phthalate, to a temperature of between about 150 and 300° C. until the reaction is completed, or has progressed to the desired extent.

According to my invention benzoic acid is produced by either of the following procedures:

(a) By heating an aqueous solution of phthalic acid;

(b) By heating the aqueous solution of a neutral alkali-metal phthalate; or (c) By heating a solution containing both free phthalic acid and a phthalic acid salt of any of the following metals:

1.—The alkali-metals, including ammonium;

2.—The alkaline earth metals including magnesium;

3.—Copper, iron, nickel, cobalt, zinc, aluminum, and manganese, and probably others.

The alkali-metals and the alkaline earth metals will be referred to generically as the alkali-forming metals.

The heating of the phthalic acid or phthalate solution is preferably carried out in an autoclave. Temperatures between 150 and 300° C. may be used, but I prefer a temperature of from about 260 to 265° C.

The mixture which I prefer to use contains equimolecular proportions of phthalic acid and sodium hydrogen phthalate, a mixture of this kind requiring about 20 hours at 260–265° C. for the reaction to go to completion.

My process may be illustrated by the following example:—

Run into an autoclave 500 lbs. of 8.4% sodium hydroxide (or 555 lbs. of 11.1% sodium carbonate solution). While agitating, add 296 lbs. of 100% phthalic anhydride. (The phthalic anhydride may be the crude product obtained by the air oxidation process). Heat this mixture at a temperature of 260–265° C. for a period of 20 hours. After cooling, dissolve the reaction product in a slight excess of sodium hydroxide. Filter off any insoluble matter. From the solution precipitate the benzoic acid by adding sulphuric acid. This crude benzoic acid is then purified in the usual manner.

I claim:—

1. The process of producing benzoic acid which comprises heating a solution of a phthalic acid compound to a temperature between about 150 and 300° C. until formation of benzoic acid has progressed to the desired extent.

2. The process of producing benzoic acid which comprises heating a solution of a phthalic acid compound to a temperature between about 260 and 265° C. until formation of benzoic acid has progressed to the desired extent.

3. The process of producing benzoic acid which comprises heating to a temperature of between 150 and 300° C. a mixture containing phthalic acid and a metal salt of phthalic acid in the presence of water.

4. The process of producing benzoic acid which comprises heating to a temperature of between about 260 and 265° C. a mixture containing phthalic acid and a metal salt of phthalic acid in the presence of water.

5. The process of producing benzoic acid which comprises heating together a mixture of phthalic acid, water, and an acid phthalate.

6. The process of producing benzoic acid which comprises heating together a mixture of phthalic acid, water, and an acid phthalate of an alkali forming metal to a temperature of from 150 to 300° C.

7. The process of producing benzoic acid which comprises heating together a mixture of phthalic acid, water, and an acid phthalate of an alkali-metal.

8. The process of producing benzoic acid which comprises heating to a temperature between 150 and 300° C. a mixture containing water and about equimolecular proportions of phthalic acid and an acid phthalate of a metal.

9. A process as set forth in claim 8 in which the temperature is kept at from 260 to 265° C.

10. The process of producing benzoic acid which comprises heating to a temperature between 150 and 300° C. a mixture containing water, and substantial proportions of phthalic acid and an acid phthalate of an alkali-metal.

11. A process as set forth in claim 10 in which the temperature is kept at 260–265° C.

12. The process of producing benzoic acid which comprises heating under pressure to a temperature between 150 and 300° C. a mixture containing phthalic acid, water, and the acid phthalate of an alkali-forming metal.

13. A process as set forth in claim 12 in which equimolecular proportions of the phthalic acid and the acid phthalate are used.

14. A process as set forth in claim 12 in which the reaction mass is heated to between 260 and 265° C. for about 20 hours.

15. The process of producing benzoic acid which comprises heating a mixture of water, phthalic acid and an acid phthalate of an alkali-metal to a temperature of from 260 to 265° C. for about 20 hours, cooling and dissolving the reaction product in a slight excess of an alkali-metal hydroxide, filtering off any insoluble matter, and adding sulphuric acid to cause precipitation of the benzoic acid.

In testimony whereof I affix my signature.

HERBERT W. DAUDT.